Aug. 17, 1937.  J. A. MORRELL  2,090,423
REVERSE BELT AND PULLEY DRIVE
Filed Nov. 5, 1935
Fig. 1.
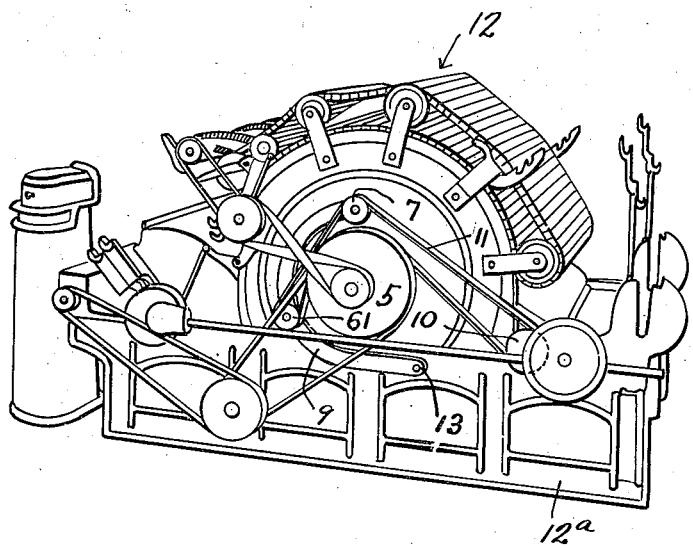
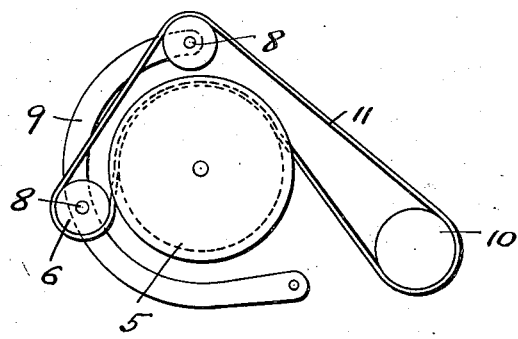
Fig. 2.
Inventor
John A. Morrell
By Clarence A. O'Brien and
Hyman Berman
Attorneys Patented Aug. 17, 1937

2,090,423

UNITED STATES PATENT OFFICE 2,090,423

REVERSE BELT AND PULLEY DRIVE

John A. Morrell, Greer, S. C.

Application November 5, 1935, Serial No. 48,439

1 Claim. (Cl. 74—242.11)

This invention relates to belt and pulley drive structures and more particularly to a reverse belt and pulley drive.

An object of the present invention is to provide a reverse belt and pulley drive which while useful on other types of machines or for other purposes will be found especially adapted for use on revolving flat card machines.

The invention together with its objects and advantages will be best understood from a study of the following description taken in connection with the accompanying drawing wherein:

Figure 1 is a perspective view of a flat card machine illustrating the application of my invention thereto.

Figure 2 is an elevational view of the invention.

Referring to the drawing by reference numerals it will be seen that the invention per se, and as shown in Figure 2, consists of a driving pulley 5, a pair of idler pulleys 6 and 7 respectively mounted on studs 8 at one end of, and intermediate the ends respectively of a substantially C-shaped arm 9 disposed substantially concentric to the drive pulley 5, a driven pulley 10 and the belt 11 the respective opposite ends of which are trained over the pulleys 6 and 10 with one run of the belt 11 being trained over the pulley 7 and the other run of the belt 11 being trained over the drive pulley 5.

In Figure 1 is illustrated the application of the invention to a revolving flat card machine indicated generally by the reference numeral 12. As illustrated the driven pulley 10 and the drive pulley 5 form part of the conventional mechanism of the machine 12.

In applying the invention to the machine the member 9 at its free end is pivoted to the frame 12a of the machine as at 13 so that the same arm 9 is disposed concentric to the pulley 5, and the belt 11 is trained over the respective pulleys in a manner hereinbefore described in detail.

With the device applied, it will be apparent that as a load is applied to the belt 11 the arm 9 is caused to swing downwardly and through the medium of the pulleys 6 and 7 thus maintain the belt 11 in a taut condition for transmitting drive from the pulley 5 through the belt 11 to the driven pulley 10, for reversing the drive of the latter.

A belt and pulley drive involving the features of the present invention as herein illustrated and described will result in longer wear for the belt 11 and at the same time the belt 11 will be always kept under tension or in a taut condition to insure maximum efficiency. Also, the drive device will require very little attention and practically no repair thus greatly reducing the cost of, for example, a machine of this character.

Having thus described the invention, what is claimed as new is:

A reverse pulley drive comprising in combination a drive pulley and a driven pulley, a substantially C-shaped arm partly surrounding the drive pulley on the side of the latter remote from the driven pulley, a pivotal connection for the arm adjacent to and below the drive pulley, upper and lower idler pulleys carried by the arm, said drive pulley being interposed between the driven pulley and the lower idler pulley, and a belt operatively engaging each of said pulleys and embodying upper and lower substantially spaced parallel flights, said upper flight extending over the outer edges of the driven and idler pulleys, and said lower flight extending from the driven pulley to the lower idler pulley and over the drive pulley said upper and lower idler pulleys maintaining the upper and lower flights respectively in a taut condition by the gravitation of the arm.

JOHN A. MORRELL.